United States Patent
Smith et al.

[11] Patent Number: 6,069,421
[45] Date of Patent: May 30, 2000

[54] ELECTRIC MOTOR HAVING COMPOSITE ENCAPSULATED STATOR AND ROTOR

[75] Inventors: Mitchell D. Smith, New London; Pieter Van Dine, Mystic, both of Conn.

[73] Assignee: Electric Boat Corporation, Groton, Conn.

[21] Appl. No.: 09/385,276

[22] Filed: Aug. 30, 1999

[51] Int. Cl.$^7$ .................................................. H02K 1/04
[52] U.S. Cl. .......................... 310/43; 310/254; 310/83; 29/596; 29/598
[58] Field of Search ............... 310/43, 87, 254; 29/596, 598; 417/902

[56] References Cited

U.S. PATENT DOCUMENTS

| | | | |
|---|---|---|---|
| 2,698,911 | 1/1955 | Schaefer | 310/86 |
| 2,938,131 | 5/1960 | Maynard | 310/87 |
| 3,270,224 | 8/1966 | Turk | 310/86 |
| 3,283,187 | 11/1966 | Schaefer | 310/87 |
| 3,382,383 | 5/1968 | Turk | 310/43 |
| 3,638,055 | 1/1972 | Zimmermann | 310/43 |
| 3,688,137 | 8/1972 | Filhol | 310/43 |
| 3,777,194 | 12/1973 | Schaefer et al. | 310/87 |
| 3,873,861 | 3/1975 | Halm | 310/43 |
| 3,874,073 | 4/1975 | Dochterman et al. | 29/598 |
| 4,492,889 | 1/1985 | Fukushi et al. | 310/87 |
| 4,496,866 | 1/1985 | Yamamoto et al. | 310/87 |
| 5,015,159 | 5/1991 | Mine et al. | 417/366 |
| 5,334,897 | 8/1994 | Ineson et al. | 310/89 |
| 5,490,319 | 2/1996 | Nakamura et al. | 29/596 |
| 5,536,985 | 7/1996 | Ward et al. | 310/44 |
| 5,767,606 | 6/1998 | Bresolin | 310/254 |

*Primary Examiner*—Nestor Ramirez
*Assistant Examiner*—Joseph Waks
*Attorney, Agent, or Firm*—BakerBotts, LLP

[57] ABSTRACT

The electric motor disclosed in the specification has an encapsulated stator which includes inner and outer annular composite layers each having a radial flange joined to an end of the other layer by chemical welds, an array of laterally adjacent circular laminations and windings in axially extending slots in the laminations adjacent to the inner composite layers, and a metal band surrounding the laminations, along with encapsulating resin filling the space between the inner an outer layers. The motor also includes an encapsulated rotor having a similar structure, but with magnets inserted in axially extending slots in the laminations adjacent to the outer composite layer and a metal band disposed between the inner annular composite layer and the laminations.

22 Claims, 4 Drawing Sheets

ELECTRIC MOTOR HAVING COMPOSITE ENCAPSULATED STATOR AND ROTOR

BACKGROUND OF THE INVENTION

This invention relates to electric motors having encapsulated stators and rotors for protection while submerged in water.

The Patent to Fukushi et al. U.S. Pat. No. 4,492,889 discloses an encapsulated stator for a submerged motor having an inner cylindrical part made of carbon fiber-reinforced plastic which is adhesively bonded to metal end covers which are welded to an outer metal cylinder. The laminations and windings of the stator enclosed between the inner composite and outer metal cylinders are encapsulated by injecting a mold resin which can contain inorganic powder material into the volume enclosed by the cylinders. The composite inner cylinder provides increased wall thickness at opposite axial end portions to provide flawless joints between the inner composite cylinder and the end According to this patent the inner cylinder may be made from any plastic material or sheet metal and any suitable material may be used for adhesively bonding the cylinders together.

The Yamamoto et al. U.S. Pat. No. 4,496,866 discloses a submersible electric motor having a stator formed from an inner thin metal cylinder surrounded by a stator core and coil and a molded resin member formed to surround the outer wall having two end faces adhesively joined to the inner cylinder.

The Nakamura et al. U.S. Pat. No. 5,490,319 also discloses an electric motor with an encapsulated stator having a core and coils embedded in plastic resin with resin molded cans that isolate the encapsulating resin from the rotor section.

The Ineson U.S. Pat. No. 5,334,897 describes a sealed electric motor having interfitting metallic housing members and an overmolded plastic casing, and the Bresolin U.S. Pat. No. 5,767,606 describes a method for manufacturing a sealed synchronous electric motor, particularly for submersible pumps by which the entire stator of the motor is embedded into a matrix of insulating resin.

SUMMARY OF THE INVENTION

It is an object of the present invention to provide encapsulated components for an electric motor which overcome disadvantages of the prior art.

Another object of the invention is to provide an electric motor having an encapsulated stator and encapsulated rotor exhibiting improved corrosion and leak resistance and improved alignment compared to conventional submersible motors.

These and other objects of the invention are attained by providing an encapsulated stator or rotor for an electric motor which includes inner and outer composite layers each having an end portion which is joined to the other layer and which contains a metallic backing ring within the enclosure formed by the inner and outer composite layers and on the side of the laminations forming the core which faces away from an adjacent rotor or stator. In a preferred embodiment, an encapsulated rotor has a peripheral annular structure consisting of an inner composite ring or "canning layer" surrounded by a metallic backing ring which supports an array of laterally adjacent circular laminations having an outer peripheral array of slots in which magnet elements such as windings or permanent magnets are located so as to generate outwardly directed magnet fields. An outer composite ring or "canning layer" surrounds the laminations and magnet elements and, to seal the entire structure, the inner and outer composite rings each have an integral end portion covering one side of the rotor so that, when each of the inner and outer composite layers is joined to the end portion of the other layer, the entire rotor structure is enclosed by composite material. In a preferred embodiment, the layers are joined by chemical welding. To complete the structure, any suitable plastic encapsulating material can be injected into the volume enclosed by the inner and outer composite layers.

The composite encapsulated stator has a similar structure with inner and outer composite canning layers having integral end portions which are joined together at opposite ends to enclose a stator structure. The stator structure includes a metallic backing ring which surrounds an array of laterally adjacent circular laminations with inner peripheral slots containing windings and these components are encapsulated in the volume enclosed by the inner and outer canning rings by injecting a suitable plastic encapsulated material. By using a composite plastic encapsulation structure, losses associated with metallic canning are avoided and corrosion and leak resistance are assured and improved accuracy in positioning of the stator and rotor is achieved using a machined inner surface of the composite inner layer for the stator and/or a machined outer surface of the outer composite layer for the rotor, if necessary.

BRIEF DESCRIPTION OF THE DRAWINGS

Further objects and advantage of the invention will be apparent from a reading of the following description in conjunction with the accompanying drawings, in which.

DESCRIPTION OF PREFERRED EMBODIMENTS

Figure 1:
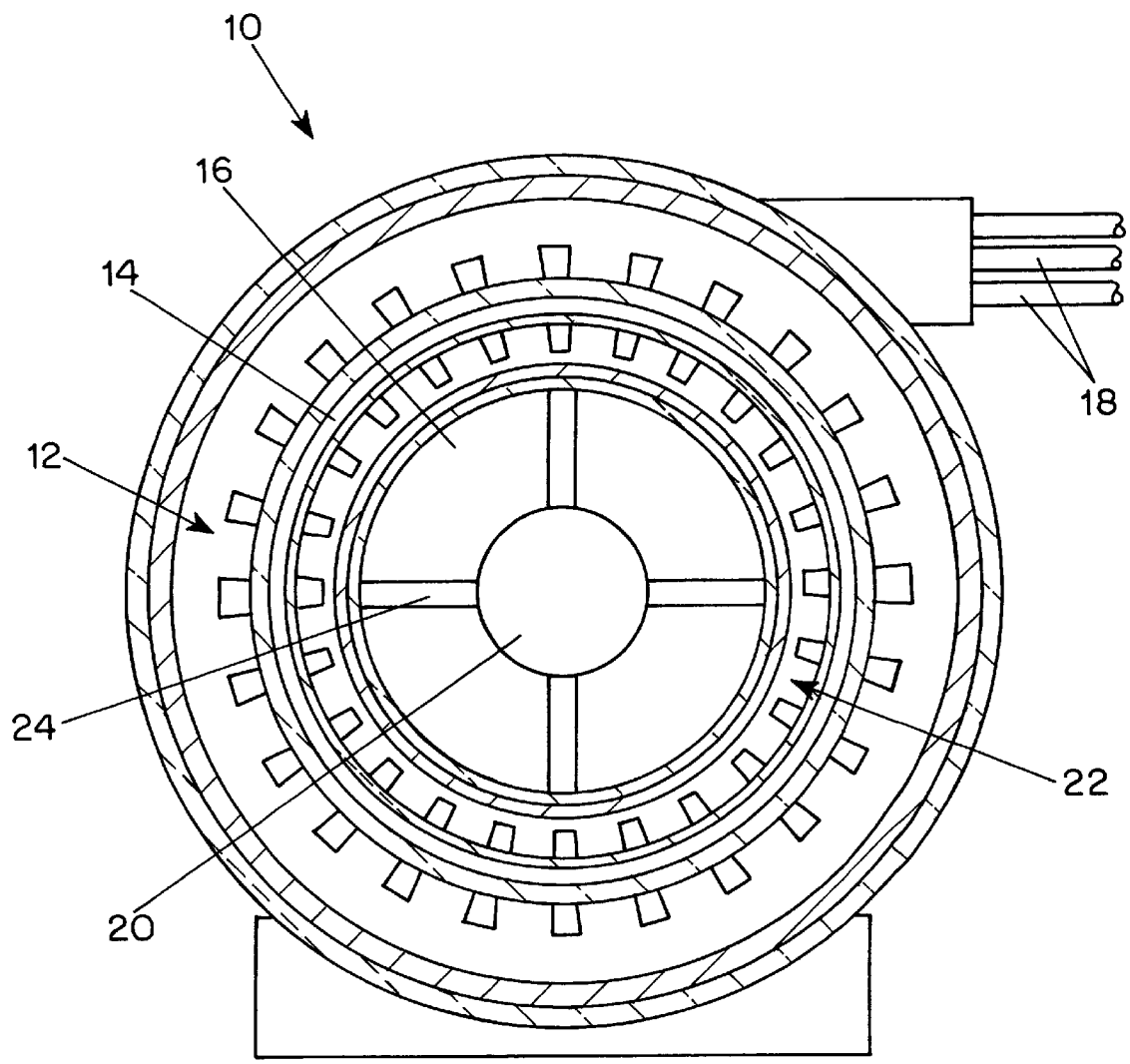
FIG. 1 is a schematic transverse cross-sectional view illustrating a representative embodiment of an electric motor having a composite encapsulated stator and a composite encapsulated rotor in accordance with the invention.
Figure 2:
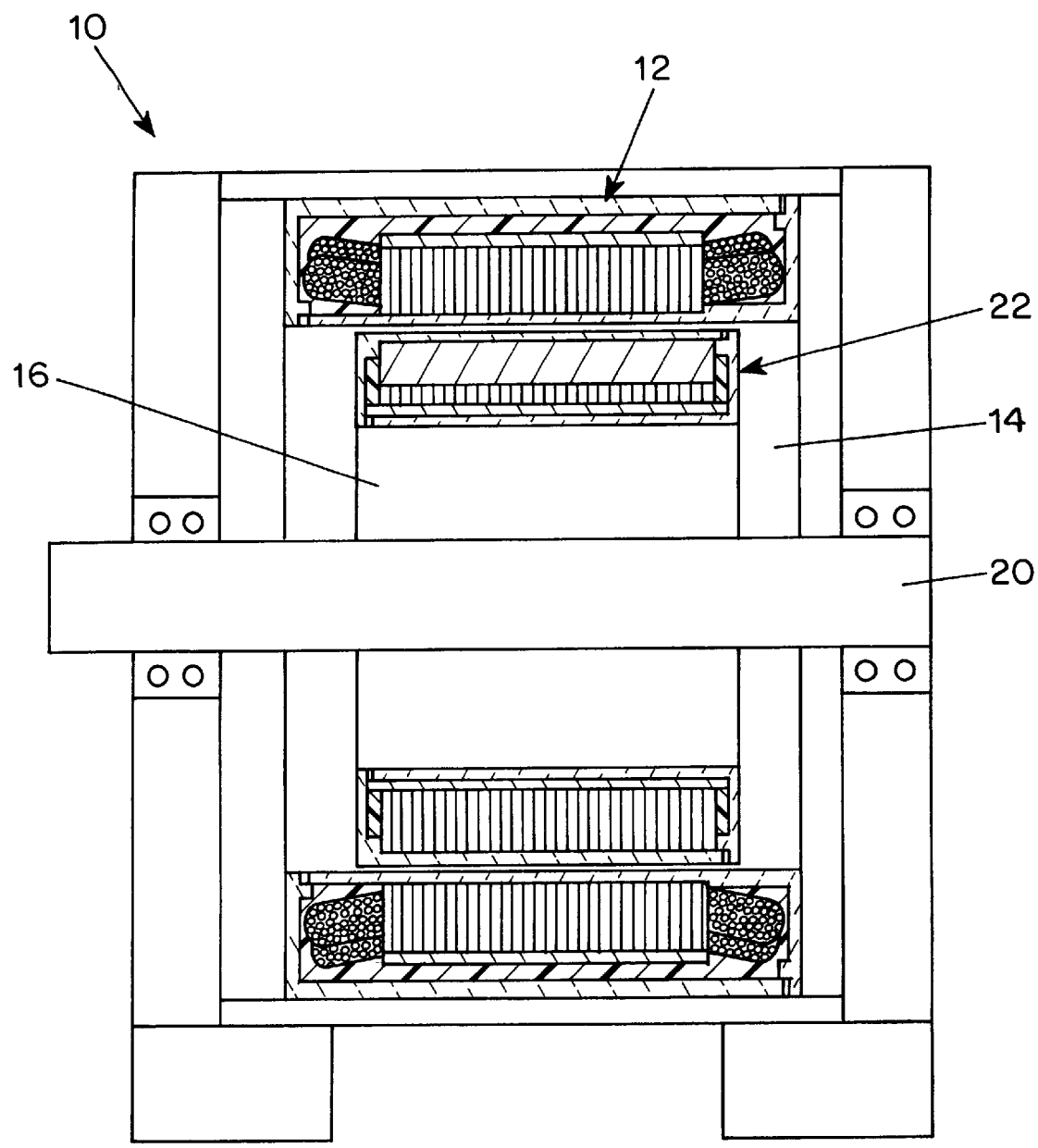
FIG. 2 is a schematic longitudinal sectional view of the electric motor shown in FIG. 1.

In the typical embodiment of the invention shown in FIGS. 1 and 2, an electric motor 10, which is to be submerged in a liquid such as water, has a composite encapsulated stator 12 with a central opening 14 and a composite encapsulated rotor 16 supported for rotation in the opening 14, along with electrical leads 18 for energizing windings in the stator 12. The rotor 16 is mounted on a central axial shaft 20 and has an annular rotor assembly 22 supported from the shaft 20 by radial arms 24.

Figure 3:
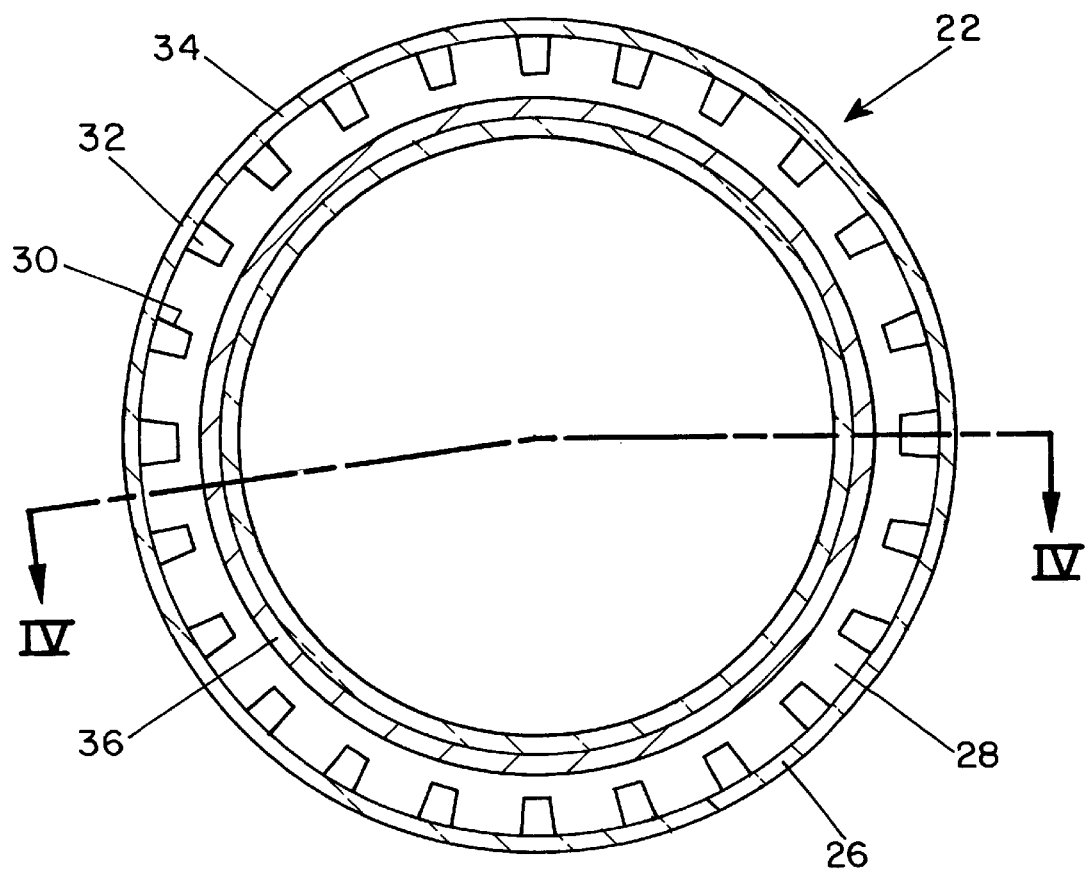
FIG. 3 is a schematic end view of a composite encapsulated rotor for the motor of FIGS. 1 and 2.

As shown in the schematic cross-sectional view of FIG. 3, the annular rotor assembly 22 has an inner annular composite layer 2, which is surrounded by a metal backing ring 36, which in turn is surrounded by an array of laterally adjacent circular laminations 28 formed with aligned outer peripheral recesses 30 providing axially extending grooves in which permanent magnets 32 are mounted, the magnets being oriented to produce magnetic fields which coact with fields generated by the stator windings to apply rotational force to the rotor. Alternatively, the magnets 32 may be replaced by conventional coil windings to generate magnetic fields corresponding to the magnetic fields produced by the magnets. The laminations 28 and magnets or windings are surrounded by an outer annular composite layer 34.

Figure 4:
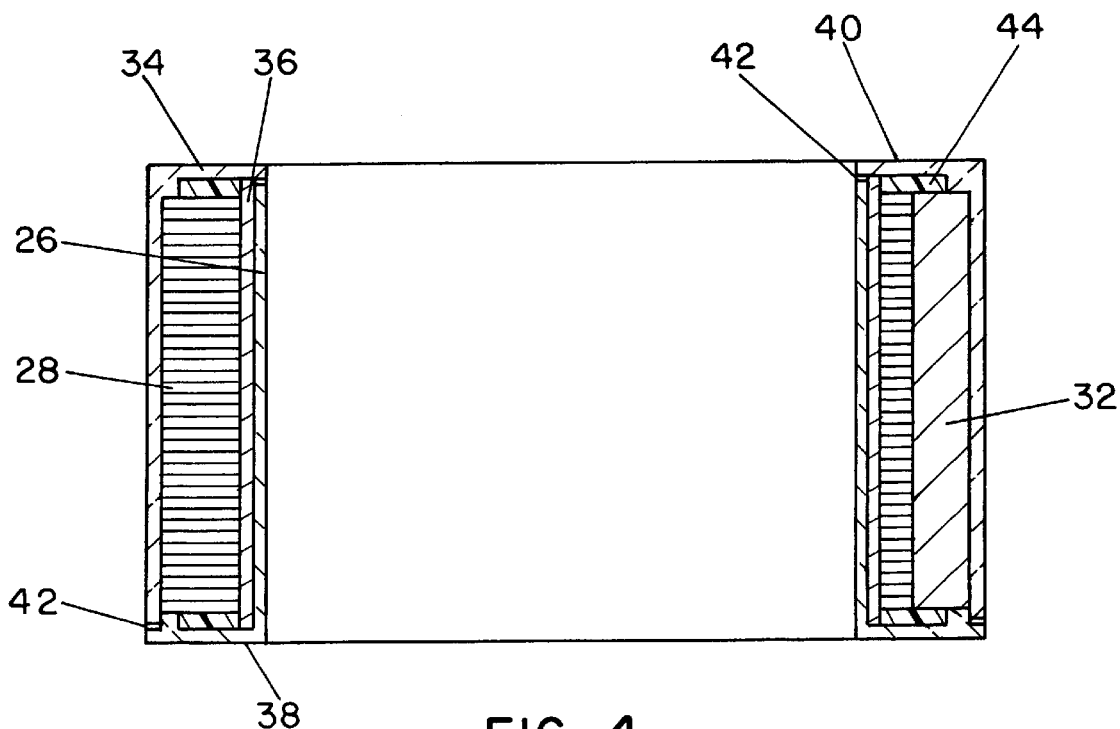
FIG. 4 is a cross-sectional view taken along the lines IV—IV of FIG. 3 and looking in the direction of the arrows.

As best seen in the cross-sectional view of the rotor shown in FIG. 4, the metallic backing ring 36 surrounds the inner annular composite layer 26 and is disposed inside in the array of laminations 28 and magnets 32. Moreover, the inner composite layer has an integral outwardly directed radial flange 38 at one end of the lamination and magnet assembly, which constitutes a location flange for both the lamination and magnet assembly and the metallic backing ring 36, and the outer composite ring 34 is formed with an integral inwardly directed radial flange 40 at the opposite end of the lamination and magnet assembly. The end edge of each of the inner and outer composite layers is chemically welded to the inner surface of the projecting flange of the other layer at weld points 42 to provide a rigid and secure assembly and the entire interior volume of the joined composite layers is filled with a suitable encapsulating plastic 44 injected through an opening in one or both of the end portions 38 and 40. With this arrangement, the rotor is effectively sealed from penetration by water or corrosive materials while providing a rigid structure having a uniform outer radius which, if necessary, may be machined to provide a radial dimension within a required tolerance.

Figure 5:
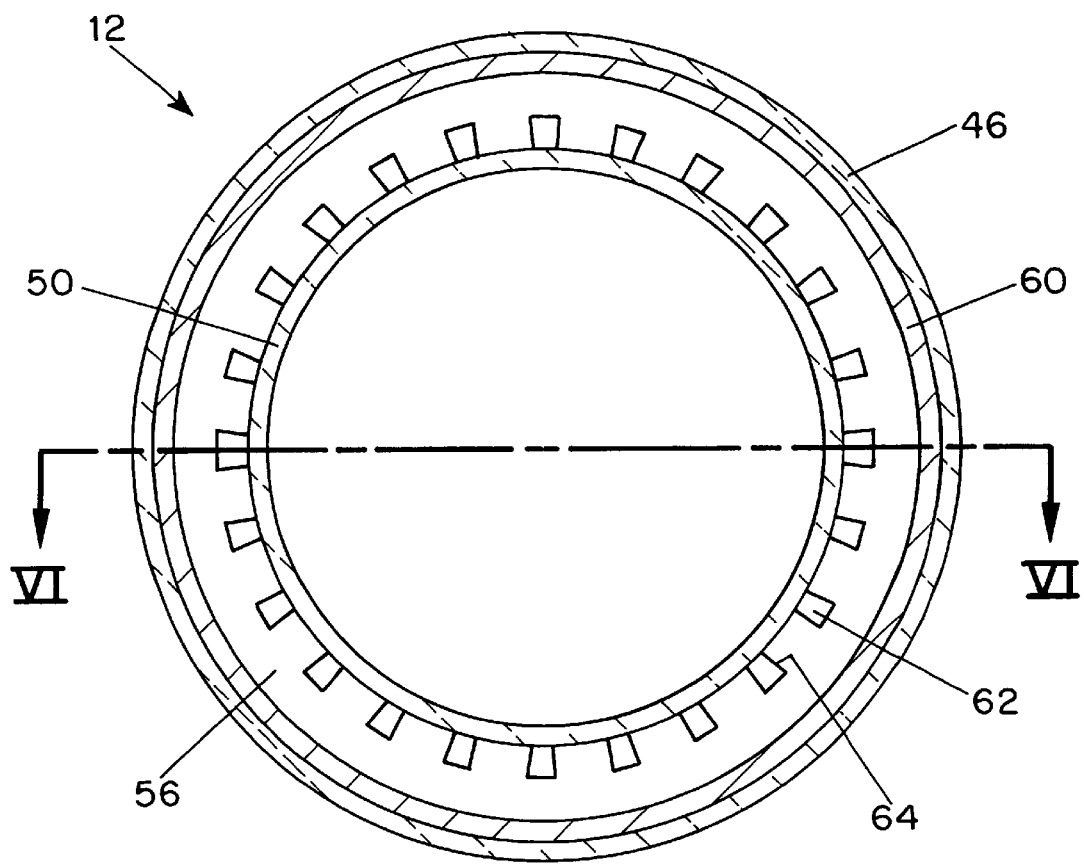
FIG. 5 is a cross-sectional view of a composite encapsulated stator for the motor of FIGS. 1 and 2.
Figure 6:
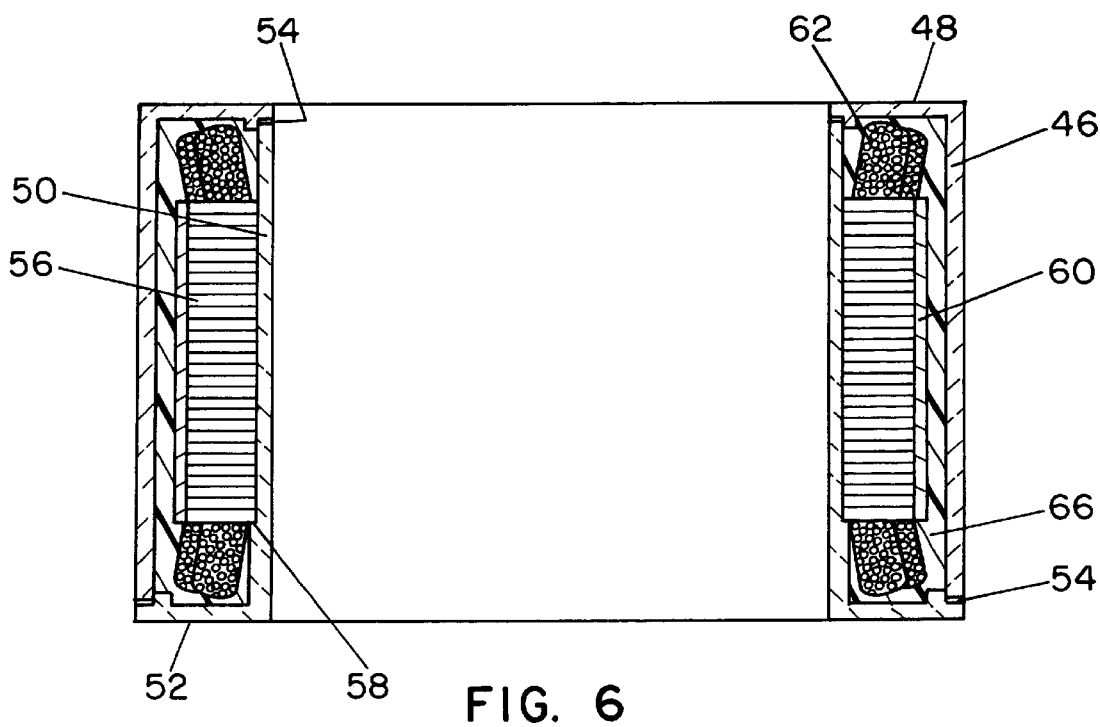
FIG. 6 is a schematic cross-sectional view taken along the lines VI—VI of FIG. 5 and looking in the direction of the arrows.

The composite encapsulated stator 12, as shown in FIGS. 5 and 6, has a similar structure, including an outer composite layer 46 having an inwardly directed radial flange 48 and an inner composite layer 50 having an outwardly directed radial flange 52, the flange of each layer being sealed by a chemical weld 54 to the end of the other layer. An array 56 of laterally adjacent circular laminations is positioned against a shoulder 58 in the inner composite layer and is surrounded by a peripheral metal backing ring 60. In order to generate appropriate magnetic fields, a plurality of windings 62 is mounted in an array of slots 64 extending parallel to the axis of the stator on the side of the laminations facing the center of the motor.

To provide the necessary strength as well as resistance to corrosive materials while reducing the weight of the components, the material used to make the inner and outer composite canning layers of the rotor and stator is preferably a high strength resin containing high modulus fibers, such as fiberglass, graphite, carbon, boron, quartz or aramid fiber material. Such composite materials produce good high temperature resistance, flame resistance and electrical resistance as well as protecting enclosed metallic parts from corrosion. The inner and outer composite layers may be molded in substantially final form or they may be machined from a blank made of the composite resin composition.

With this arrangement, a rigid stator structure is provided and, if necessary, the inner surface of the inner composite layer 50 may be machined to provide an accurate radial dimension within required tolerances. At the same time the structure avoids any losses resulting from metal canning interposed in the magnetic field extending between the stator and the rotor. After the inner and outer composite layers have been assembled enclosing the stator laminations 56 and coils 62, a suitable encapsulating material 66 is injected into one or more appropriate openings into the space enclosed by the inner and outer composite layers.

An electric motor containing a composite stator encapsulation and a composite rotor encapsulation in accordance with the invention avoids losses associated with metal canning, provides reduced overall weight and improved corrosion resistance when operated in a corrosive environment and assures improved accuracy and positioning of the stator and rotor.

Although the invention has been described herein with reference to specific embodiments, many modifications and variations therein would readily occur to those skilled in the art. Accordingly, all such variations and modifications are included within the intended scope of the invention.

We claim:

1. An encapsulated stator for an electric motor comprising an annular inner composite layer having an outwardly directly radial flange, an annular outer composite layer having an inwardly directed radial flange, each said radial flange being joined to an end of an other annular composite layer, an array of laterally adjacent circular laminations within the space enclosed by the inner and outer annular composite layers, a metal backing ring surrounding the laminations, and a plurality of windings disposed in axially extending slots in the laminations adjacent to the inner annular composite layer.

2. An encapsulated stator according to claim 1 wherein the radially extending flanges of the inner and outer annular composite layers are joined to the ends of the outer and inner annular composite layers, respectively, by chemical welds.

3. An encapsulated stator according to claim 1 including a body of resin material filling the space enclosed by the inner and outer annular composite layers to encapsulate the laminations and the windings therein.

4. An encapsulated stator according to claim 1 wherein the inner annular composite layer is formed with a shoulder to position the laminations and the windings within the space enclosed by the inner and outer annular composite layers.

5. An encapsulated stator according to claim 1 wherein the inner and outer annular composite layers comprise a high strength resin containing high modulus fibers.

6. An encapsulated stator according to claim 5 wherein the fibers are selected from the group consisting of fiberglass, graphite, boron, carbon, quartz and aramid fiber materials.

7. An encapsulated stator according to claim 1 including a machined inner surface on the inner annular composite layer.

8. An encapsulated rotor for an electric motor comprising an annular inner composite layer having an outwardly directly radial flange, an annular outer composite layer having an inwardly directed said radial flange, each radial flange being joined to an end of an other annular composite layer, an array of laterally adjacent circular laminations within the space enclosed by the inner and outer annular composite layers, a metal backing ring between the laminations and the annular inner composite layer, and a plurality of magnet elements disposed in axially extending slots in the laminations adjacent to the outer annular composite layer.

9. An encapsulated rotor according to claim 8 wherein the radially extending flanges of the inner and outer annular composite layers are joined to the ends of the outer and inner annular composite layers, respectively, by chemical welds.

10. An encapsulated rotor according to claim 8 including a body of resin material filling the space enclosed by the inner and outer annular composite layers to encapsulate the laminations and the magnets therein.

11. An encapsulated rotor according to claim 8 wherein the outwardly directed radial flange of the inner annular composite layer provides a surface to position the laminations and the magnets within the space enclosed by the inner and outer annular composite layers.

12. An encapsulated rotor in according to claim 8 wherein the inner and outer annular composite layers comprise a high strength resin containing high modulus fibers.

13. An encapsulated rotor according to claim 12 wherein the fibers are selected from the group consisting of fiberglass, graphite, boron, carbon, quartz and aramid fiber materials.

14. An encapsulated rotor according to claim 8 including a machined outer surface on the inner annular composite layer.

15. An electric motor comprising an encapsulated stator having inner and outer annular composite stator layers, an array of laterally adjacent stator laminations within a space enclosed by the inner and outer annular composite stator layers, a plurality of windings disposed in axially extending slots in the stator laminations adjacent to the inner annular composite stator layer and an encapsulating resin material filling the space between the inner and outer annular composite stator layers, and an encapsulated rotor rotationally supported within the encapsulated stator comprising inner and outer annular composite rotor layers, an array of laterally adjacent circular rotor laminations within a space enclosed by the inner and outer annular composite rotor layers, a plurality of magnets disposed in axially extending slots in the array of rotor laminations adjacent to the outer annular composite rotor layers, and an encapsulating resin material filling the space between the inner and outer annular rotor composite layers.

16. An electric motor according to claim 15 including radially extending flanges on the inner and outer composite stator layers joined to ends of the outer and inner composite stator layers, respectively, and radially extending flanges on the inner and outer composite rotor layers joined to ends of the outer and inner composite rotor layers, respectively.

17. An electric motor according to claim 15 including a body of resin material filling the space enclosed by the inner and outer annular composite stator layers to encapsulate the laminations and the windings therein and a body of resin material filling the space enclosed by the inner and outer composite rotor layers to encapsulate the laminations and magnet elements therein.

18. An electric motor in accordance with claim 15 wherein the inner annular composite stator layer is formed with a shoulder to position the array of laminations and the windings within the space enclosed by the inner and outer annular composite stator layers.

19. An electric motor according to claim 15 wherein the inner and outer annular composite stator and rotor layers comprise a high strength resin containing high modulus fibers.

20. An electric motor according to claim 19 wherein the high modulus fibers are selected from the group consisting of fiberglass, graphite, boron, carbon, quartz and aramid fiber materials.

21. An electric motor according to claim 15 including a machined inner surface on the inner annular composite stator layer.

22. An electric motor according to claim 15 including a machined outer surface on the outer composite layer.

* * * * *

UNITED STATES PATENT AND TRADEMARK OFFICE
CERTIFICATE OF CORRECTION

PATENT NO. : 6,069,421
DATED : May 30, 2000
INVENTOR(S) : Mitchell D. Smith, et al.

It is certified that error appears in the above-identified patent and that said Letters Patent is hereby corrected as shown below:

ON THE COVER:

[57] ABSTRACT line 9: "an" should read
-- and --;

IN THE CLAIMS:

Column 4, line 16: "an other" should read --
another --

Column 4, line 18: "the" (first occurrence) should read -- a --;

Column 4, line 47: "each radial" should read
-- each said radial --;

Column 4, line 48: "an other" should read --
another --

UNITED STATES PATENT AND TRADEMARK OFFICE
CERTIFICATE OF CORRECTION

PATENT NO. : 6,069,421
DATED : May 30, 2000
INVENTOR(S) : Mitchell D. Smith, et al.

It is certified that error appears in the above-identified patent and that said Letters Patent is hereby corrected as shown below:

Column 4, line 48: "an other" should read -- another --

Signed and Sealed this

Twenty-second Day of May, 2001

Attest:

NICHOLAS P. GODICI

*Attesting Officer*   *Acting Director of the United States Patent and Trademark Office*